US011359889B1

(12) United States Patent
Emery et al.

(10) Patent No.: US 11,359,889 B1
(45) Date of Patent: *Jun. 14, 2022

(54) METALLIZED TEXTILE FOR MULTISPECTRAL CAMOUFLAGE

(71) Applicant: Milliken & Company, Spartanburg, SC (US)

(72) Inventors: Nathan B. Emery, Spartanburg, SC (US); Michael C. Gillespie, Easley, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,816

(22) Filed: Dec. 17, 2020

Related U.S. Application Data

(63) Continuation of application No. 15/211,766, filed on Jul. 15, 2016, now Pat. No. 10,921,095, which is a continuation of application No. 14/931,023, filed on Nov. 3, 2015, now abandoned.

(51) Int. Cl.
| | |
|---|---|
| *F41H 3/00* | (2006.01) |
| *F41H 5/04* | (2006.01) |
| *B32B 15/14* | (2006.01) |
| *B32B 5/02* | (2006.01) |

(52) U.S. Cl.
CPC .............. *F41H 3/00* (2013.01); *B32B 5/024* (2013.01); *B32B 15/14* (2013.01); *Y10T 428/25* (2015.01); *Y10T 428/256* (2015.01)

(58) Field of Classification Search
None
See application file for complete search history.

(56) References Cited

U.S. PATENT DOCUMENTS

| | | | |
|---|---|---|---|
| 4,095,940 A | 6/1978 | Weingarten | |
| 4,495,239 A | 1/1985 | Pusch et al. | 428/192 |
| 5,798,304 A | 8/1998 | Clarkson | |
| 5,955,175 A | 9/1999 | Culler | 428/209 |
| 6,127,007 A | 10/2000 | Cox et al. | 428/15 |
| 7,008,694 B1 | 3/2006 | Frankel | |
| 7,102,814 B1 | 9/2006 | Hughes | 359/350 |
| 7,135,424 B2 | 11/2006 | Worley et al. | 442/131 |
| 7,163,580 B2 | 1/2007 | Minami | 106/404 |
| 7,244,684 B2 | 7/2007 | Hexels | 442/64 |
| 7,455,904 B2 | 11/2008 | O'Keefe | 428/403 |
| 7,832,018 B2 | 11/2010 | Schwarz | 2/69 |
| 7,846,510 B2 | 12/2010 | Afshar | 427/419.1 |
| 7,901,756 B2 | 3/2011 | Burr et al. | 428/123 |
| 8,333,863 B2 | 12/2012 | Kelsey et al. | 156/278 |
| 8,404,330 B2 | 3/2013 | Bletsos et al. | 427/137 |
| 8,779,964 B2 | 7/2014 | Kelsey et al. | 342/3 |
| 8,883,905 B2 | 11/2014 | Takano et al. | 524/441 |
| 8,916,265 B1 | 12/2014 | Kelsey et al. | 428/316.6 |
| 8,918,919 B2 | 12/2014 | Scholz | 2/458 |
| 8,932,965 B1 | 1/2015 | Wendel | 442/59 |
| 9,005,741 B1 | 4/2015 | Hoffer et al. | 428/196 |
| 9,062,938 B1 | 6/2015 | Mcintosh | |
| 2004/0116025 A1 | 6/2004 | Gogins | |
| 2006/0128243 A1 | 6/2006 | Kong | |
| 2009/0214852 A1 | 8/2009 | Kelsey | |
| 2009/0263644 A1 | 10/2009 | Kelsey | |
| 2010/0224402 A1 | 9/2010 | Lim | |
| 2010/0263109 A1 | 10/2010 | Noerenberg et al. | 2/456 |
| 2011/0065347 A1 | 3/2011 | Havird | |
| 2012/0288662 A1 | 11/2012 | Conolly | 428/87 |
| 2013/0212789 A1 | 8/2013 | Conolly et al. | 2/458 |
| 2014/0154482 A1 | 6/2014 | Jang | 428/196 |
| 2014/0205798 A1 | 7/2014 | Williams et al. | 428/138 |
| 2014/0227552 A1 | 8/2014 | Lau et al. | 428/621 |
| 2014/0242355 A1 | 8/2014 | Castille | 428/196 |
| 2014/0304883 A1 | 10/2014 | Morag et al. | 2/69 |
| 2014/0356574 A1 | 12/2014 | Conolly et al. | 428/138 |

FOREIGN PATENT DOCUMENTS

| | | |
|---|---|---|
| CN | 101628644 B | 3/2011 |
| JP | H01297462 A | 11/1989 |
| JP | H03205463 A | 9/1991 |
| JP | 200453039 | 2/2004 |
| JP | 2004053039 A | 2/2004 |

(Continued)

OTHER PUBLICATIONS

Eckart, "IReflex" Product Information, Sep. 22, 2015 <https://web.archive.org/web/20150922064827/http://www.eckart.net.coatings/industrial-coatings/wood-coatings/aqueous-systems/functiona;/ireflex.html>.
U.S. Appl. No. 15/211,766, filed Jul. 15, 2016, Pending.
Complete Textile Glossary, Woven Fabric, Celanese Acetate LLC. (Year: 2001) 212 pages.
Mehrizi, M. Khajeh, et al. "Effect of Carbon Black Nanoparticles on Reflective Behavior of Printed Cotton/Nylon Fabrics in Visible/near Infrared Regions." Fibers and Polymers, vol. 13, No. 4, May 3, 2012, pp. 501-506., doi: 10.1007/s12221-012-0501-5. (Year: 2012).

(Continued)

*Primary Examiner* — Cheng Yuan Huang
(74) *Attorney, Agent, or Firm* — Cheryl Brickey

(57) ABSTRACT

A metalized textile containing a textile, a first metalized layer at least partially covering a first side of the textile, and a second metalized layer at least partially covering the first metalized layer. The first metalized layer covers at least a portion of the surfaces of the plurality of yarns of the textile, where the first metalized layer contains a metal. The second metalized layer is adjacent to the first metalized layer at least partially covering the first metalized layer and contains a plurality of metallic particles, binder, and a pigment. The second metalized layer comprises a pattern of at least 2 colors, where at least one of the colors contains a plurality of metallic particles and a pigment. At least two colors have a difference in reflectivity of at least 20% in each of the following regions: 1 μm, 2 μm, average over 3-5 μm, and average over 8-12 μm.

25 Claims, 1 Drawing Sheet

(56) References Cited

FOREIGN PATENT DOCUMENTS

JP          3572173 B2     9/2004

OTHER PUBLICATIONS

Rouette, Hans-Karl. "Dyeing of Cotton." Encyclopedia of Textile Finishing. Woodhead Publishing, 2001. 132. Retrieved from https://app.knovel.eom/hotlink/toc/id:kpETF00001/encyclopedia-textile/encyclopedia-textile (Year: 2001) 2 pages.

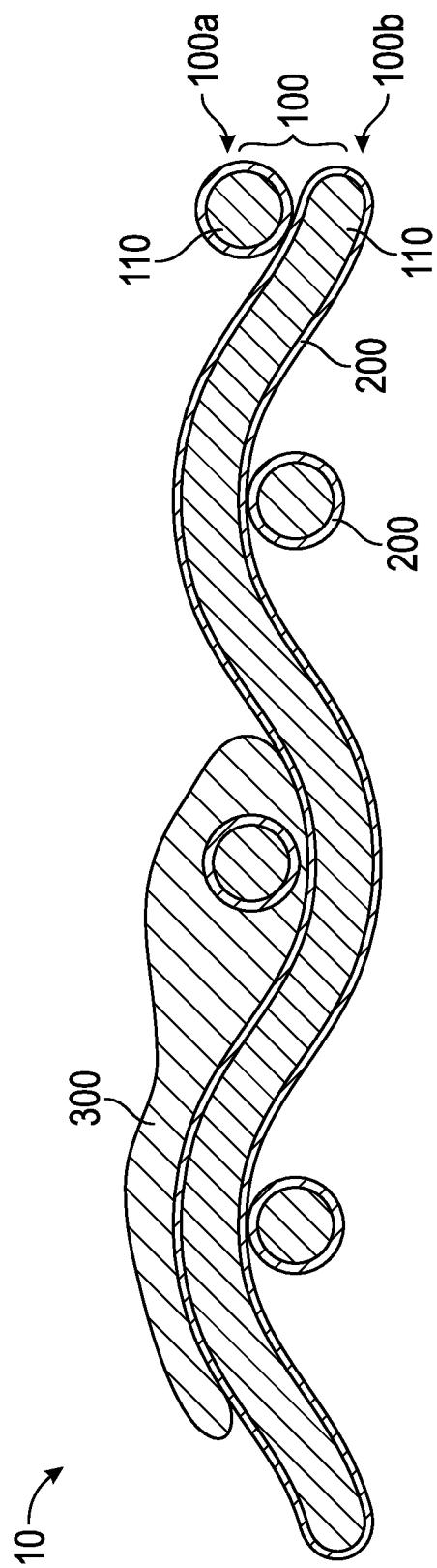

METALLIZED TEXTILE FOR MULTISPECTRAL CAMOUFLAGE

RELATED APPLICATIONS

This application is a Continuation of co-pending U.S. patent application Ser. No. 15/211,766 filed on Jul. 15, 2020, now U.S. Pat. No. 10,921,095, which is a continuation of application Ser. No. 14/931,023 filed on Nov. 3, 2015, both of which are herein incorporated by reference in their entirety.

TECHNICAL FIELD OF THE INVENTION

The present invention is directed towards metalized textiles for use in multispectral camouflage products.

BACKGROUND

Camouflage textiles are typically used to reduce the discoverability of a soldier in the visible and near infrared of the electromagnetic spectrum. However, as technology advances and thermal imaging devices become more advanced and readily available, there is a need to protect the soldier from detection in the thermal infrared regions as well.

BRIEF SUMMARY OF THE INVENTION

A metalized textile containing a textile, a first metalized layer at least partially covering a first side of the textile, and a second metalized layer at least partially covering the first metalized layer. The first metalized layer contains a metal and the second metalized layer contains a plurality of metallic particles, binder, and a pigment.

BRIEF DESCRIPTION OF THE DRAWINGS

FIG. 1 illustrates a cross-sectional view of one embodiment of the metalized textile.

DETAILED DESCRIPTION

Camouflage patterns are designed to blend with the background so that whatever is behind the camouflage is obscured from view. Prior to the 1980's, the main concerns were in the visible and near infrared portions of the spectrum. With the advent of detection technology in the short wave infrared (SWIR), mid wave infrared (MWIR), and long wave infrared (LWIR), there has become a need to extend the camouflage protection into these wavelengths. In the visible region, the color of the camouflage must somewhat match the surroundings. It has been shown that using multiple colors in a pattern provides improved blending with the background if the background is not a single color. The pattern chosen must provide break up similar in scale to the background. In the near infrared region, the portions of the pattern must reflect similar to the background as the detection device is using reflected light to form an image. Typical reflectance values range from about 10% for dark colors to about 70% for light colors. The same is true in the SWIR region. In the MWIR and LWIR the detection devices form an image of thermal energy being emitted. In this thermal portion of the spectrum, the portions of the pattern must emit thermal energy similar to the background. The emitted energy can be a combination of reflected and transmitted energy. Typical emissivity values for the thermal portion of the spectrum range from 0.9 for the dark portions of the pattern to 0.3 for the light areas of the pattern. For simplicity, the reflectivity is basically one minus the emissivity, so the range of reflectance values in the thermal ranges from about 10% for dark areas to 70% for light areas. The invention relates to achieving necessary light shades (cream, light tan, etc) on metallized base fabrics (for example copper/nickel) while at the same time retaining acceptable thermal reflectance. The invention also enables the achievement of the desired NIR/SWIR signature in any of the medium and light colors over the overriding signature of the underlying metal. The fabric layers can be tailored to produce the desired reflectances across the spectrum: VIS/NIR/SWIR/MWIR/LWIR.

This invention comprises a family of textiles that have a first metalized layer and a second metalized layer were the second metalized layer may be screen printed with a mix of pigments to produce a textile with the desired signature from the visual through the long wave infrared portion of the spectrum. The visual coloration is obtained using standard organic, inorganic or a combination of organic and inorganic pigments.

Referring now to FIG. 1, the metalized textile 10 contains a textile 100 having a first side 100a and a second side 100b. The textile may be any suitable textile including a woven, non-woven, or knit textile.

In one embodiment, the textile 100 is a woven textile. The weave may be, for example, plain, satin, twill, basket-weave, poplin, jacquard, or crepe weave textiles. Preferably, the textile materials are provided in a woven construction, such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, ½, ⅓, or ¼ twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

In another embodiment, the textile 100 is a knit textile, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the textile 100 is a multi-axial, such as a tri-axial textile (knit, woven, or non-woven). In another embodiment, the textile 100 is a bias textile. In another embodiment, the textile is a unidirectional textile and may have overlapping yarns or may have gaps between the yarns.

In another embodiment, the textile 100 is a non-woven textile. The term "non-woven" refers to structures incorporating a mass of yarns or fibers that are entangled and/or heat fused so as to provide a coordinated structure with a degree of internal coherency. Non-woven textiles may be formed from many processes such as for example, meltspun processes, hydroentangeling processes, mechanically entangled processes, stitch-bonding processes and the like.

The textile 100 contains any suitable yarns. "Yarn", in this application, as used herein includes a monofilament elongated body, a multifilament elongated body, ribbon, strip, yarn, tape, fiber and the like. The textile 100 may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

The textile 100 can be formed from a single plurality or type of yarn (e.g., the fabric can be formed solely from yarns comprising a blend of cellulosic fibers and synthetic fibers, such as polyamide fibers), or the textile can be formed from several pluralities or different types of yarns (e.g., the fabric can be formed from a first plurality of yarns comprising cellulosic fibers and polyamide fibers and a second plurality of yarns comprising an inherent flame resistant fiber). In one preferred embodiment, the fibers in the textile may include filament nylon, and polyester and spun nylon, polyester, cotton, SPANDEX™ (or other elastic fibers) and/or nomex.

Preferably, the textile comprises cellulosic fibers. As utilized herein, the term "cellulosic fibers" refers to fibers composed of, or derived from, cellulose. Examples of suitable cellulosic fibers include cotton, rayon, linen, jute, hemp, cellulose acetate, and combinations, mixtures, or blends thereof. Preferably, the cellulosic fibers comprise cotton fibers.

In those embodiments in which the textile comprises cellulosic fibers, the cellulosic fibers can be present in the textile in any suitable amount. For example, in certain embodiments, the cellulosic fibers can comprise about 15% or more, about 20% or more, about 25% or more, about 30% or more, or about 35% or more, by weight, of the fibers present in the textile. While the inclusion of cellulosic fibers can improve the comfort of the textile (e.g., improve the hand and moisture absorbing characteristics), the exclusive use of cellulosic fibers may affect the durability of the textile. Accordingly, it may be desirable to use other fibers (e.g., synthetic fibers) in combination with the cellulosic fibers in order to achieve a desired level of durability. Thus, in such embodiments, the cellulosic fibers can comprise about 95% or less or about 90% or less, by weight, of the fibers present in the textile. More specifically, in certain embodiments, the cellulosic fibers can comprise about 15% to about 95%, about 20% to about 95%, about 25% to about 95%, about 30% to about 95%, or about 30% to about 90%, by weight, of the fibers present in the textile material.

In certain embodiments of the invention, one or more of the yarns in the textile can comprise thermoplastic synthetic fibers. For example, the yarn can comprise a blend of cellulosic fibers and thermoplastic synthetic fibers. These thermoplastic synthetic fibers typically are included in the textile in order to increase its durability. This increased durability of the yarn, in turn, leads to an increased durability for the textile. Suitable thermoplastic synthetic fibers include, but are not necessarily limited to, polyester fibers (e.g., poly(ethylene terephthalate) fibers, poly(propylene terephthalate) fibers, poly(trimethylene terephthalate) fibers), poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, an elastic polyester-polyurethane copolymer (SPANDEX®), flame-resistant meta-aramid (NOMEX®) and combinations, mixtures, or blends thereof. In one preferred embodiment, the textile comprises cotton and nylon yarns. In another embodiment, the textile comprises nylon and spandex yarns.

In those embodiments in which the textile comprises thermoplastic synthetic fibers, the thermoplastic synthetic fibers can be present in one of the pluralities or types of yarn used in making the textile in any suitable amount. In certain preferred embodiments, the thermoplastic synthetic fibers comprise about 65% or less, about 60% or less, or about 50% or less, by weight, of the fibers present in one of the pluralities or types of yarn used in making the textile material. In certain preferred embodiments, the thermoplastic synthetic fibers comprise about 5% or more or about 10% or more, by weight, of the fibers present in one of the pluralities or types of yarn used in making the textile material. Thus, in certain preferred embodiments, the thermoplastic synthetic fibers comprise about 0% to about 65% (e.g., about 5% to about 65%), about 5% to about 60%, or about 10% to about 50%, by weight, of the fibers present in one of the pluralities or types of yarn used in making the textile material.

In one preferred embodiment, the textile comprises a plurality of yarns comprising a blend of cellulosic fibers and synthetic fibers (e.g., synthetic staple fibers). In this embodiment, the synthetic fibers can be any of those described above, with polyamide fibers (e.g., polyamide staple fibers) being particularly preferred. In such an embodiment, the cellulosic fibers comprise about 30% to about 90% (e.g., about 40% to about 90%, about 50% to about 90%, about 70% to about 90%, or about 75% to about 90%), by weight, of the fibers present in the yarn, and the polyamide fibers comprise about 10% to about 50% (e.g., about 10% to about 40%, about 10% to about 35%, about 10% to about 30%, or about 10% to about 25%), by weight, of the fibers present in the yarn. In one preferred embodiment, the textile contains an 80/20 blend of nylon and cotton, sometimes referred to as NyCo fabric.

Certain embodiments of the textile of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

The inherent flame resistant fibers can be present in the textile in any suitable amount. Generally, the amount of inherent flame resistant fibers included in the textile will depend upon the desired properties of the final textile. In certain embodiments, the inherent flame resistant fibers can comprise about 20% or more, about 25% or more, about 30% or more, about 35% or more, about 40% or more, or about 45% or more, by weight, of the fibers present in the textile. In certain embodiments, the inherent flame resistant fibers can comprise about 75% or less, about 70% or less, about 65% or less, about 60% or less, about 55% or less, about 50% or less, about 45% or less, or about 40% or less, by weight, of the fibers present in the textile. Thus, in certain embodiments, the inherent flame resistant fibers can comprise about 20% to about 70%, about 25% to about 75% (e.g., about 25% to about 60%, about 25% to about 50%, about 25% to about 45%, or about 25% to about 40%), about 30% to about 70%, about 35% to about 65%, about 40% to about 60%, or about 45% to about 55%, by weight, of the fibers present in the textile.

Referring back to FIG. 1, at least the first side 100a of the textile 100 is at least partially covered by a first metalized layer 200. Preferably, the first side 100a of the textile 100 is fully covered by a first metalized layer 200. In another embodiment, the first side 100a and the second side of the textile 100 are at least partially covered by a first metalized layer 200. In another embodiment, the first side 100a and the second side of the textile 100 are fully covered by a first metalized layer 200. In another embodiment, all of the surfaces of the yarns 110 within the textile layer 100 are covered essentially fully covered by a first metalized layer 200. The metallization can take place on either or both sides of the textile 100 and also partially or fully within the structure of the textile.

Preferably, the first metallized layer 200 does not significantly decrease the breathability and porosity of the textile 100. The amount of porosity varies greatly for the desired end use. For example, a typical uniform would likely have air permeability in the range of 15-100 ft$^3$/ft$^2$/min. A poncho fabric or tarp would likely have air permeability near zero. A knit used for a balaclava might have air permeability in the range of 100-400 ft$^3$/ft$^2$/m in.

The first metalized layer 200 can be applied to the textile 100 in any suitable manner, including but not limited to, physical vapor deposition by, for example, sputter coating, vacuum vaporization, chemical vapor deposition, electroless plating, electrostatic coating. The first metalized layer can also be applied using dip coating, curtain coating, knife coating, gravure coating, printing, or by other known coating techniques. The emissivity of the metal coating can range from 0.04 to 1, depending on the desired thermal performance. The emissivty/reflectivity in the thermal portion of the spectrum is measured with the Surface Optics SOC 410 Hand Held DHR Reflectometer. In the case where a uniform metal is applied to the fabric first, a high reflectance is most desirable as it can be tuned down with the color layers. In the case where the metal is mixed in the print paste, the reflectivity is tuned by color to the appropriate reflectivity.

The metal used in the first metallized layer can be any suitable metal that produces the desired reflective effect, such as aluminum, gold, silver, copper, zinc, cobalt, nickel, platinum, palladium, tin, titanium or the like, or any alloys or combinations of these metals.

In one preferred embodiment, the first metallized layer comprises two sub layers, a first sub-layer and a second sub-layer, wherein the first sub-layer is located closer to and covering at least a portion of at least the first side of the textile and the second sub-layer is located on and at least partially covers the first sub-layer. In one embodiment, the materials forming the first sub-layer and the second sub-layer are the same. In another embodiment, the materials forming the first sub-layer and the second sub-layer are different. In a preferred embodiment, the first sub-layer comprises copper and the second sub-layer comprises nickel. Preferably, the copper is applied to the textile using electroless plating and the nickel is applied using electroplating. It has been found that a combination of sub-layers of copper and nickel can produce a durable layer of metal on a fabric with good reflectivity properties.

Referring back to FIG. 1, a second metalized layer 300 is shown which at least partially covering the first metalized layer 200. The second metalized layer 300 comprises a plurality of metallic particles, binder, and at least one of an organic and inorganic pigment.

In one the first metalized layer 200 essentially completely covered by the second metalized layer 300. In another embodiment, the first metalized layer 200 is at least partially covered by a second metalized layer 300. The metallization can take place on either or both sides of the textile 100 (and/or the first metalized layer 200) and also partially or fully within the structure of the textile.

The second metalized layer 300 may contain any suitable metal such as any metal discussed in the first metalized layer 200. In one preferred embodiment, the second metalized layer 300 contains aluminum particles. Aluminum is preferred because it is readily available, relatively inexpensive, highly reflective, and light in shade.

The binder in the second metalized layer may be any suitable binder. Typical binders include acrylic, acrylate, urethane, and styrene based binders. The binders have to be selected so that they are compatible with screen printing systems —they cannot set up too fast or the screens may become clogged. Some binders are self-crosslinking, some need a cross linker. A crosslinking agent is typically included to insure complete cross linking or film forming of the polymer. Typical binder loading is in the 10%-25% range based on active solids. Enough binder must be used to lock down the pigments and metal particles. The acrylics and blends comprising acrylics are preferred as they are most compatible with the screen printing operation.

The second metalized layer 300 contains at least one pigment which may be inorganic or organic. In one embodiment, the second metalized layer comprises an organic pigment. Organic pigments may be preferred for some applications due to their typically lower cost than inorganic pigments. Many of the inorganics are relatively expensive and are mainly used in applications exposed to high levels of UV light. Most colors are made with combinations of yellow, red, green, and blue pigments.

In another embodiment, the second metalized layer 300 contains inorganic pigments such as titanium dioxide, aluminum, magnesium hydroxide, zinc sulfide, and zinc oxide. Inorganic pigments could likely be used and produce a similar result. Titanium dioxide is preferred for some applications as it produces a white color and is relatively inexpensive. Carbon black may be used if the reflectance of a particular color needs to be reduced. The titanium dioxide increases the reflectance in the NIR and SWIR regions while the aluminum increases reflectance in the MWIR and LWIR regions.

In one embodiment, the second metalized layer 300 covers essentially the whole first metalized layer 200 and forms a solid or almost solid color to the textile. In another preferred embodiment, the second metalized layer 300 is applied to the first metalized layer 200 in a pattern. This pattern may be regular or random, may cover between about 1 and 100% of the surface area of the textile. In another embodiment, the pattern may cover between about 2% and 98%, more preferably between about 10 and 90%.

In one embodiment, the second metalized layer contains different areas having different compositions (such as different colors printed on different parts of a garment to form a camouflage pattern). In some cases the different compositions touch, in some cases there is space between the different compositions, and in some cases there is overlap of the different compositions. In all of these cases, the entire printed layer will be considered to be the second metalized layer 300. In the cases where there are multiple compositions forming the second metalized layer 300 at least one of the compositions contains a metal. Where the pattern contains 2 colors (two different compositions) at least one of the colors contains the plurality of metallic particles and the pigment. In one embodiment, the pattern is a camouflage pattern. The camouflage pattern may contain a number of colors, in one embodiment the camouflage pattern contains 2 colors and in another embodiment the camouflage pattern contains 3 patterns. In another embodiment, the camouflage pattern contains 4 or more, 5 or more, or 6 or more colors.

In one embodiment, the inorganic pigment is chemically attached to the metallic particle with in the second metalized layer 300 such as the pigment IREFLEX™ available from Eckart. This pigment gives significant whiteness allowing light shades to more easily be made on darker bases without significantly changing the thermal reflectance. The powdered IREFLEX contains 65-70% aluminum, 20-30% $TiO_2$, and 2.5-10% $SiO_2$.

The metalized textile may be used as a fabric or may undergo further operations to become a finished good. The textile may be used for any article where camouflage in the VIS, NIR, SWIR, MWIR, and/or LWIR is desired such as articles of clothing, tents, structures, camouflage to cover objects and more. As a garment, the metalized textile may be used for any suitable garment including, but not limited to, pants, shirts, outerwear such as jackets, shoes, hats, scarves, and belts.

Example 1

Example 1 was a printed camouflage fabric. The fabric was a plain weave, ripstop woven fabric made from yarns containing a 50%/50% blend of nylon and cotton fibers. The reflectance of woven fabric (without any metallized layers or coatings) was: 81% @ 1 micron, 40% @ 2 microns, 16% @ 3-5 microns, and 9% @ 8-12 microns.

A copper sub-layer was added to the fabric using electroless coating and then a nickel sub-layer was added to the fabric (over the nickel layer) using electroplating. The thickness of the copper/nickel layer was approximately 400 nm. The reflectance of the metallized fabric was: 33% @ 1 micron, 49% @ 2 microns, 51% @ 3-5 microns, and 54% @ 8-12 microns.

The metalized fabric was then printed with a second metalized layer. The second metlauized layer was a camouflage layer formed from 4 different colors that were printed in a pattern across the surface of the fabric over the copper/nickel layer. The second metalized layer covered essentially all of the surface of the fabric.

The compositions and reflectance measurements for each color were as follows:

|  | % wt (total printing comp.) of non-metallic pigment | % wt (total printing comp.) of metallic pigment | % Refl. at 1 μm | % Refl. at 2 μm | % Avg. refl. at 3-5 μm | % Avg. refl. at 8-12 μm |
|---|---|---|---|---|---|---|
| Dark Brown | 8.5% | 0% | 14% | 20% | 20% | 20% |
| Dark Tan | 11.0% | 3% | 54% | 56% | 41% | 39% |
| Medium Tan | 5.8% | 3% | 54% | 56% | 46% | 39% |
| Light Tan | 3.9% | 7% | 57% | 62% | 55% | 51% |

In order to maintain desirable break up across the spectrum, there are preferably at least 2 sections of the pattern differing by at least 20% reflectance across the portion of the spectrum from 1-12 microns (for example 25% and 50% in the 1 μm, 2 μm, 3-5 μm, and 8-12 μm regions). Ideally there would be three regions differing by approximately 15-20% reflectance (for example 20%, 40%, 60%). In the example above, the dark brown would be the low reflector, the dark and medium tan would be the mid-range, and the light tan would be the high. The reflectance characteristics of the colors could be further tailored if need be by altering the compositions to increase or decrease the reflectance across the regions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A metalized textile having an upper and lower surface comprising:
    a textile having a first side, a second side, and a plurality of yarns;
    a first metalized layer covering at least a portion of the surfaces of the plurality of yarns of the textile, wherein the first metalized layer comprises a metal; and,
    a second metalized layer adjacent to the first metalized layer at least partially covering the first metalized layer, wherein the second metalized layer comprises a plurality of metallic particles, binder, and a pigment, wherein the second metalized layer comprises a pattern,
    wherein the pattern contains at least 2 colors, wherein at least one of the colors comprises the plurality of metallic particles and the pigment, wherein at least two colors have a difference in reflectivity of at least 20% in each of the following regions: 1 µm, 2 µm, average over 3-5 µm, and average over 8-12 µm.

2. The metalized textile of claim 1, wherein the textile is a woven or knit textile.

3. The metalized textile of claim 1, wherein the first metalized layer comprises a first sub-layer and a second sub-layer, wherein the first sub-layer covers all of the surfaces of the plurality of yarns of the textile and the second sub-layer is adjacent to the first sub-layer and at least partially covering the first sub-layer.

4. The metalized textile of claim 1, wherein the plurality of metallic particles comprise aluminum.

5. The metalized textile of claim 1, wherein the pattern is a camouflage pattern comprising at least 3 colors.

6. A garment comprising the metalized textile of claim 1.

7. The garment of claim 6, wherein the garment has an air permeability of between about 15 and 100 ft$^3$/ft$^2$/min.

8. An article comprises the metalized textile of claim 1.

9. The metalized textile of claim 1, wherein the second metalized layer forms the upper surface of the metalized textile.

10. A metalized textile having an upper and lower surface comprising:
    a textile having a first side, a second side, and a plurality of yarns, wherein the plurality of yarns comprise a plurality of fibers selected from the group consisting of nylon, cotton, polyester, rayon, meta-aramid, and mixtures thereof;
    a first metalized layer at least partially covering the first side of the textile, wherein the first metalized layer comprises a metal, wherein the metal is selected from the group consisting of copper, silver, nickel, and aluminum; and,
    a second metalized layer adjacent to the first metalized layer at least partially covering the first metalized layer, wherein the second metalized layer comprises a pattern containing at least 3 colors, and wherein the second metalized layer forms the upper surface of the metalized textile, wherein at least one of the colors comprises a plurality of metallic particles and a pigment, wherein at least two colors have a difference in reflectivity of at least 20% in each of the following regions: 1 µm, 2 µm, average over 3-5 µm, and average over 8-12 µm.

11. The metalized textile of claim 10, wherein the first metalized layer comprises a first sub-layer and a second sub-layer, wherein the first sub-layer covers all of the surfaces of the plurality of yarns of the textile and the second sub-layer is adjacent to the first sub-layer and at least partially covering the first sub-layer.

12. The metalized textile of claim 10, wherein the plurality of metallic particles comprise aluminum.

13. The metalized textile of claim 10, wherein the pattern is a camouflage pattern comprising at least 3 colors.

14. A garment comprising the metalized textile of claim 10.

15. The garment of claim 14, wherein the garment has an air permeability of between about 15 and 100 ft$^3$/ft$^2$/min.

16. An article comprises the metalized textile of claim 10.

17. The metalized textile of claim 10, wherein the second metalized layer forms the upper surface of the metalized textile.

18. A metalized textile having an upper and lower surface comprising:
    a woven textile having a first side, a second side, and a plurality of yarns, wherein the weave of the textile is selected from the group consisting of a plain, twill, basket-weave, poplin, jacquard, and crepe weave;
    a first metalized layer at least partially covering the first side of the textile, wherein the first metalized layer comprises a metal, wherein the metal is selected from the group consisting of copper, silver, nickel, and aluminum; and,
    a second metalized layer adjacent to the first metalized layer at least partially covering the first metalized layer, wherein the second metalized layer comprises a pattern containing at least 3 colors, and wherein the second metalized layer forms the upper surface of the metalized textile, wherein at least one of the colors comprises a plurality of metallic particles and a pigment, wherein at least two colors have a difference in reflectivity of at least 20% in each of the following regions: 1 µm, 2 µm, average over 3-5 µm, and average over 8-12 µm.

19. The metalized textile of claim 18, wherein the first metalized layer comprises a first sub-layer and a second sub-layer, wherein the first sub-layer covers all of the surfaces of the plurality of yarns of the textile and the second sub-layer is adjacent to the first sub-layer and at least partially covering the first sub-layer.

20. The metalized textile of claim 18, wherein the plurality of metallic particles comprise aluminum.

21. The metalized textile of claim 18, wherein the pattern is a camouflage pattern comprising at least 3 colors.

22. A garment comprising the metalized textile of claim 18.

23. The garment of claim 22, wherein the garment has an air permeability of between about 15 and 100 ft$^3$/ft$^2$/min.

24. An article comprises the metalized textile of claim 18.

25. The metalized textile of claim 18, wherein the second metalized layer forms the upper surface of the metalized textile.

* * * * *